United States Patent [19]

McDougal et al.

[11] Patent Number: 4,479,485
[45] Date of Patent: Oct. 30, 1984

[54] POWER EFFICIENCY FOR VERY HIGH TEMPERATURE SOLAR THERMAL CAVITY RECEIVERS

[75] Inventors: Allan R. McDougal, LaCanada-Flintridge; Robert R. Hale, Upland, both of Calif.

[73] Assignee: The United States of America as represented by the United States Department of Energy, Washington, D.C.

[21] Appl. No.: 368,245

[22] Filed: Apr. 14, 1982

[51] Int. Cl.³ .............................................. F24J 3/02
[52] U.S. Cl. ..................................... 126/439; 126/441
[58] Field of Search ............... 126/438, 439, 441, 451, 126/440

[56] References Cited

U.S. PATENT DOCUMENTS

| | | | |
|---|---|---|---|
| 1,969,839 | 8/1934 | Goddard | 126/439 |
| 2,741,691 | 4/1956 | Lee | 126/439 |
| 3,490,950 | 1/1970 | Myer | 136/89 |
| 3,957,029 | 5/1976 | Nozik et al. | 428/336 X |
| 3,998,206 | 12/1976 | Jahn . | |
| 4,090,498 | 5/1978 | Benson | 126/425 |
| 4,125,109 | 11/1978 | Erwin | 126/451 |
| 4,131,485 | 12/1978 | Meirel et al. . | |
| 4,164,123 | 8/1979 | Smith | 126/438 X |
| 4,198,953 | 4/1980 | Power | 126/439 X |
| 4,402,306 | 9/1983 | McElroy | 126/439 |

FOREIGN PATENT DOCUMENTS

| | | | |
|---|---|---|---|
| 394232 | 4/1924 | Fed. Rep. of Germany | 126/439 |
| 2738667 | 3/1979 | Fed. Rep. of Germany | 126/441 |
| 472427 | 6/1952 | Italy | 126/438 |
| 162362 | 12/1981 | Japan | 126/438 |
| 844943 | 7/1981 | U.S.S.R. | 126/438 |

OTHER PUBLICATIONS

"Baffle Keeps Solar Energy in Receiver", p. 27 of NASA Tech. Briefs, Spring 1981.

Primary Examiner—Margaret A. Focarino
Attorney, Agent, or Firm—Michael F. Esposito

[57] ABSTRACT

This invention is an improved solar energy cavity receiver for exposing materials and components to high temperatures. The receiver includes a housing having an internal reflective surface defining a cavity and having an inlet for admitting solar radiation thereto. A photothermal absorber is positioned in the cavity to receive radiation from the inlet. A reflective baffle is positioned between the absorber and the inlet to severely restrict the re-radiation of energy through the inlet. The front surface of the baffle defines a narrow annulus with the internal reflective surface of the housing. The front surface of the baffle is contoured to reflect incoming radiation onto the internal surface of the housing, from which it is reflected through the annulus and onto the front surface of the absorber. The back surface of the baffle intercepts infrared radiation from the front of the absorber. With this arrangement, a high percentage of the solar power input is retained in the cavity; thus, high internal temperatures are attained.

9 Claims, 2 Drawing Figures

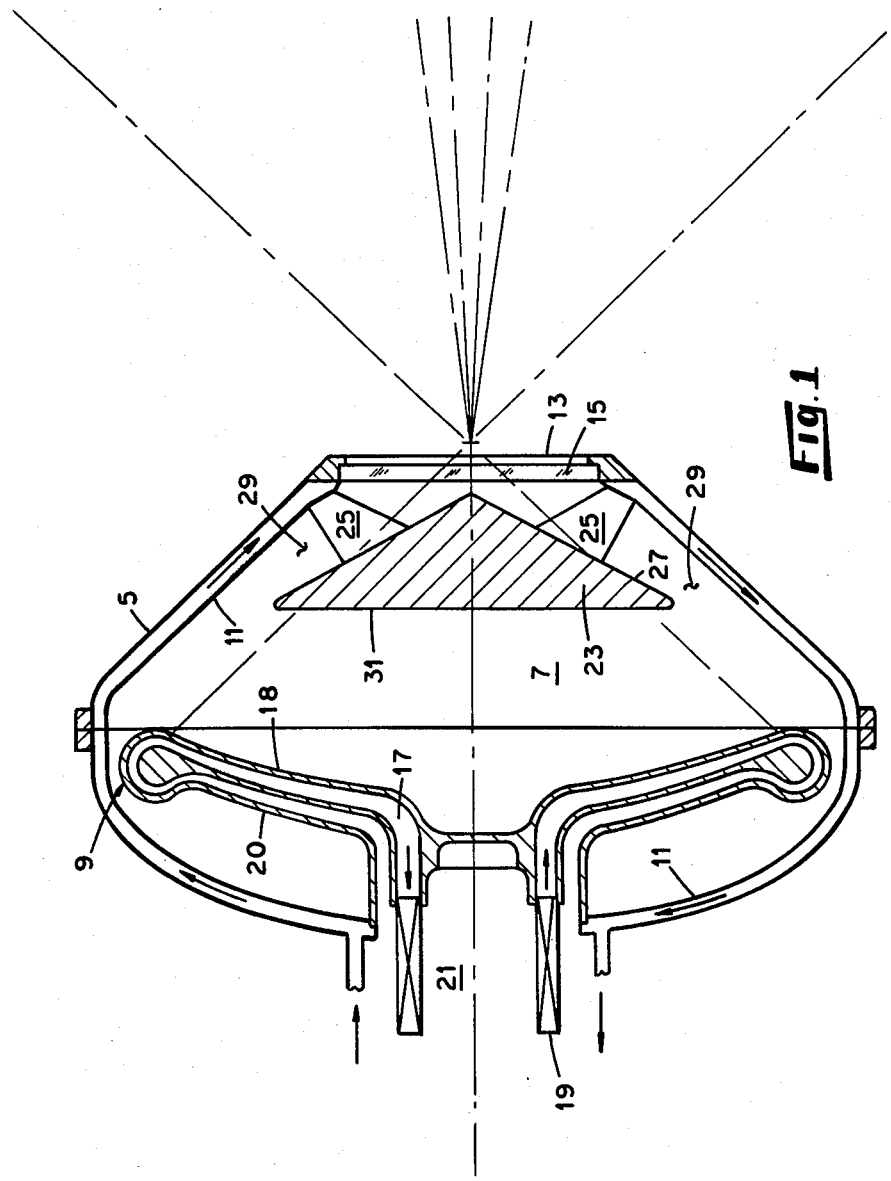

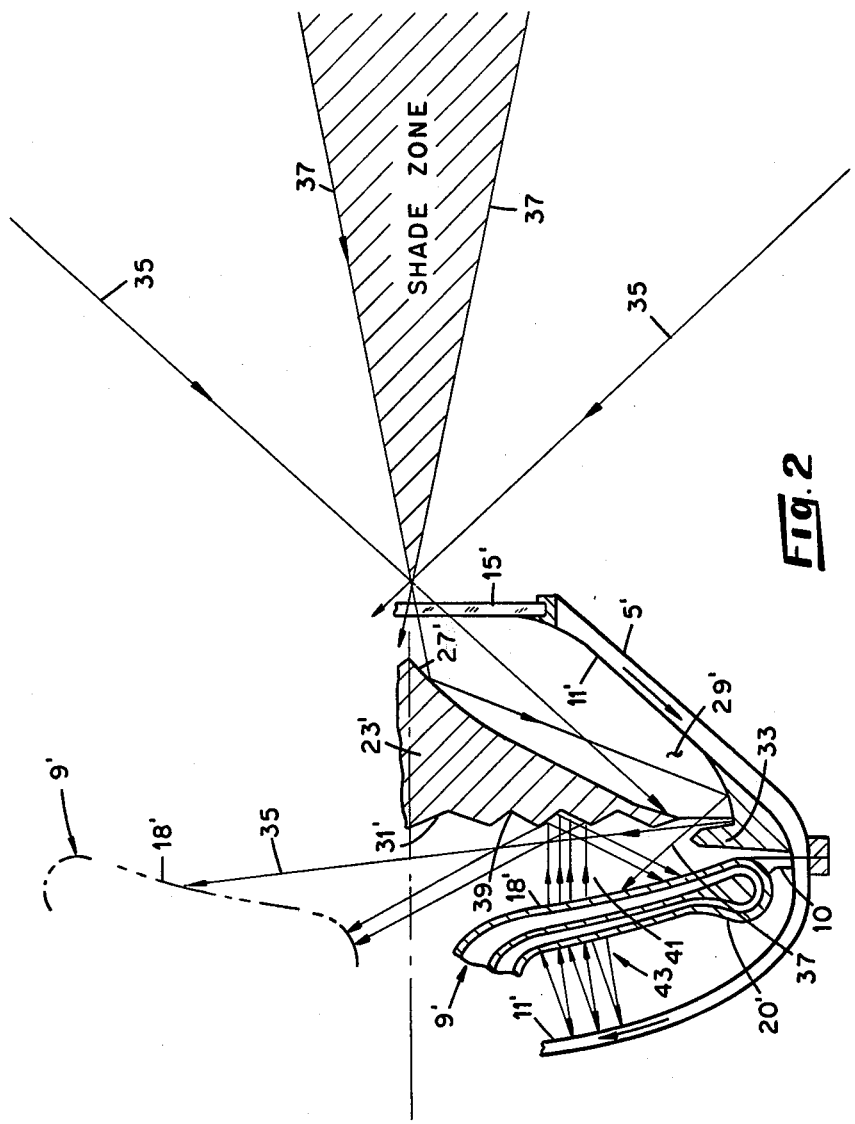

POWER EFFICIENCY FOR VERY HIGH TEMPERATURE SOLAR THERMAL CAVITY RECEIVERS

The invention was made as a result of a contract with the United States Department of Energy.

BACKGROUND OF THE INVENTION

This invention relates generallly to an apparatus for absorbing solar power, and more particularly, to solar ovens, solar cells for testing materials at high temperatures, and other solar power receivers of the cavity type.

This invention was an outgrowth of research directed toward development of a solar cavity receiver such as a test cell, for testing the performance of various materials at temperatures on the order of 3000° F. Operation at such temperatures may be a requirement for components of large-scale systems for utilizing solar thermal energy.

Referring to FIG. 1, initially the solar cavity receiver consisted of two major components: (a) a housing 5 and (b) a photothermal absorber 9, or heat exchanger, positioned within the cavity. As shown, the housing defined a coaxial inlet 13 in which a window 15 was mounted for transmission of a concentrated solar beam into the cavity and onto the absorber. As shown, absorber 9 could be a generally dish-shaped member formed with an internal passage 17 for circulation of a heat-transfer fluid through a heat exchanger 19.

After consideration of the above-described receiver, we concluded that significant power losses would occur because part of the incoming solar power would be radiated back through window 15. That is, part of the incoming rays would be reflected back through the window and part of the infrared radiation generated by the heated absorber 9 would be radiated through the window. These power losses would appreciably limit the maximum temperature attainable in the cavity which, as in this case, could be used as a test cell, or as a thermochemical process vessel, a heat source for a thermodynamic cycle engine, etc.

SUMMARY OF THE INVENTION

Accordingly, it is an object of this invention to provide an improved solar power absorption apparatus.

It is another object to provide a solar power receiver of a novel design with a higher maximum temperature capability.

It is another object to provide a solar power receiver of the cavity type, the receiver being designed to maximize the retention of solar generated heat in the receiver.

It is another object to provide a solar power receiver of the cavity type, the receiver being designed to maximize utilization of the solar power input thereto.

Other objects and advantages will be made evident hereinafter.

In one aspect, the invention is an apparatus for absorbing solar power. The apparatus comprises a solar radiation receiver which has a cavity with an internal reflective surface. The receiver includes an inlet for transmitting solar radiation into the cavity. An absorber for solar radiaton is mounted in the cavity. Mounted between the absorber and the inlet is a baffle which has a reflective back surface confronting the absorber. The baffle has a reflective front surface which defines, with the above-mentioned internal surface, an annulus extending about the axis of the receiver. The reflective front surface is contoured to receive solar radiation from the inlet and to reflect the same to the absorber through said annulus via secondary reflection from the aforementioned internal surface.

BRIEF DESCRIPTION OF THE DRAWINGS

FIG. 1 is a schematic side view, partly in section, of a solar power cavity receiver designed in accordance with the invention, FIG. 2 is a ray diagram for another receiver designed in accordance with the invention, the receiver being shown in a fragmentary schematic side view.

DETAILED DESCRIPTION OF THE INVENTION

Our invention is applicable to solar receivers in general. For brevity, it will be illustated below in terms of an improved solar receiver of the cavity type.

Referring again to FIG. 1, the above-described receiver is shown as modified in accordance with the invention. A generally cone-shaped opaque baffle 23 is mounted coaxially in cavity 7 of the aforementioned housing 5 and is rigidly supported therein by plates 25. Preferably, the baffle is cooled by circulating a fluid through passageways (not shown) in the baffle and plates. The front surface 27 of the baffle has a reflective finish and defines a relatively narrow annulus 29 with the reflective interior 11 of the housing. The back surface 31 of the baffle is also reflective and confronts the front surface of the absorber 9.

The baffle 23 is positioned so that its front surface 27 intercepts most of the radiation entering the cavity 7. The reflective front surface is contoured to direct the intercepted radiation onto the front face 18 of the absorber 9 via single reflection off the interior surface 11 of the housing. That is, the front surface of the baffle is designed to direct the incoming rays to the surface 11 and thence, through the annulus 29, to the front surface of the absorber. The back surface 31 of the baffle is designed to intercept most of the infrared radiation emitted from the front surface 18 of the absorber and to direct it generally obliquely back to the absorber. Thus, the confronting surfaces 18 and 31 effect absorption of most of the infrared radiation emitted from the front of the absorber. Being positioned as shown, the baffle 23 also blocks the escape of visible radiation which is reflected in the direction of the window by the interior surface 11 of the housing. Infrared radiation emitted by the back surface 20 of the absorber is reflected back to surface 20 by the adjacent surface 11 of the housing. Thus, the various reflective surfaces of the improved cavity receiver cooperatively effect retention of a high percentage of the solar power entering the receiver.

FIG. 2 is a ray diagram for an improved solar cavity receiver which is generally similar to the receiver shown in FIG. 1. The receiver shown in FIG. 2 includes the following components, which function similarly to those previously described: a housing 5' composed of a suitable material such as aluminum or graphite and including a highly reflective surface 11' and a pressure window 15' composed of a suitable material such as fused silica or sapphire, for sealing the cavity; a refractory (e.g., SiC) absorber 9' mounted on supports 10, one of which is shown; and a baffle 23' made of a suitable material such as stainless steel having a highly reflective front surface 27' of low solar ray absorptance, such as silver plating, and a back surface 31' of low infrared absorptance such as gold plating, the latter surface being configured to promote diffuse reflection of radiation received from the absorber and typically comprising a concentric series of V-grooves 39.

As shown, the housing is formed with an internal ring portion 33 which extends toward the edge of the baffle. The forward face of the ring portion has the same surface finish as surface 11' and the rearward face has the same surface finish as surface 31' to restrict escape of radiation from surface 18'.

Although in the embodiment shown, the configuration of front surface 27' and internal surface 11' appear concave, this is not essential. In all applications those surfaces are so configured that their coaction directs impinging rays for eventual absorptance within the cavity.

Still referring to FIG. 2, the solar flux entering the window 15' is received from any suitable solar source, such as a conventional paraboloidal dish-shaped mirror concentrator (not shown). In FIG. 2, the beam bundle received from the concentrator is characterized by a central shade zone; this feature is not essential to attainment of the objectives of the invention. Referring to the beam bundle, its outermost rays 35, its innermost rays 37, and the rays therebetween pass through the window and are intercepted by the front surface 27' of the baffle. As indicated, the intercepted rays are reflected from surface 27' to surface 11', which reflects them through the annulus 29' and onto various portions of the front surface 18' of the absorber 9'.

As shown in FIG. 2, infrared radiation 41 emitted by the surface 18' of the absorber is reflected back to the absorber by the rear face 31' of the baffle. Infrared radiation 43 emitted by the back face 20' of the absorber is reflected back to that face by the adjacent surface 11' of the housing.

The foregoing description of the invention has been presented to explain the principles of the invention and to illustrate its application to solar cavity receivers. The description is not intended to be exhaustive or to limit the invention to the particular embodiments disclosed. Obviously, many modifications and variations are possible in light of the above teachings. For instance, various reflective surface platings or coatings may be utilized to attain the purposes of the invention. Given the teaching herein, one skilled in the art can determine the most suitable contours for the reflective surfaces for a particular application, without resorting to more than routine calculation or experimentation. The absorber (9, FIG. 1) may be any suitable device for absorbing solar radiation and may have various configurations. The window (15, FIG. 1) is not required for all applications, but is used where a pressurized heat-transfer fluid is circulated through the cavity. Preferably, the above-mentioned baffle is designed to intercept virtually all of the rays entering the cavity.

It is intended that the scope of the invention be defined by the appended claims.

What is claimed is:

1. Apparatus for absorbing a beam of concentrated solar power for utilization comprising:
    a cavity receiver having internal reflective surfaces and an inlet for transmission of solar radiation into the cavity;
    a radiation absorber having front and back surfaces mounted within the cavity;
    a baffle provided with front and back reflective surfaces;
    means for mounting said baffle within said cavity between said front surface of said absorber and said inlet enabling said front surface of said baffle to intercept directly substantially all of the radiation entering the cavity and reflect said radiation to said absorber via secondary reflection from the internal surfaces of the cavity and enabling said back surface of said baffle to intercept substantially all of the infrared radiation emitted from the front surface of the absorber.

2. The apparatus of claim 1 in which the reflective back surface of the baffle has a low infrared radiation absorptance.

3. The apparatus of claim 1 in which the reflective front surface of the baffle has a low solar radiation absorptance.

4. The apparatus of claim 1 in which the inlet to the cavity receiver is enclosed by a window of a material such as fused silica or sapphire for containing a gaseous atmosphere within the cavity.

5. The apparatus of claim 1 in which the baffle is generally in the shape of a cone, said back surface being the base of said cone.

6. The apparatus of claim 1 in which the front surface of the baffle is the conical surface of the cone.

7. The apparatus of claim 1 in which the back surface of the baffle is configured to promote diffuse reflection of infrared radiation received from the absorber comprising mechanical contouring such as a concentric series of V-grooves.

8. The apparatus of claim 1 in which an annular projection within the cavity projects toward the baffle to restrict escape of radiation from the absorber, said projection having a forward face which has a low solar-radiation absorptance and a rearward face which has a low infrared radiation absorptance.

9. Apparatus for absorbing a beam of concentrated solar power for utilization, including a cavity receiver having an inlet for transmission of solar radiation into the cavity, a radiation absorber within the cavity, and in which said cavity is provided with internal reflective surfaces, and a radiation trap positioned within the cavity between the inlet and the absorber adjacent said inlet to intercept directly substantially all of the solar radiation transmitted through said inlet, said trap having a surface of low solar radiation absorptance and which reflects impinging rays toward the internal reflective surfaces of the cavity for directing the same toward the absorber, and in which said trap has a back surface confronting the absorber, said back surface being of low infrared radiation absorptance.

* * * * *